United States Patent

[11] 3,604,899

[72] Inventor John William Donohoe
South Natick, Mass.
[21] Appl. No. 10,772
[22] Filed Feb. 12, 1970
[45] Patented Sept. 14, 1971
[73] Assignee Dennison Manufacturing Company
Framingham, Mass.

[54] MARK-DETECTING SYSTEM
10 Claims, 6 Drawing Figs.

[52] U.S. Cl. .......... 235/61.11 E, 250/219 D
[51] Int. Cl. .......... G06k 7/14, G01n 21/30
[50] Field of Search .......... 235/61.11 R, 61.11 E, 61.6 E; 250/219 D, 219 DC, 219 R, 219 Q, 219 FR; 35/48

[56] References Cited

UNITED STATES PATENTS

| | | | |
|---|---|---|---|
| 2,825,818 | 3/1958 | Richardson .......... | 250/219 DC |
| 3,517,167 | 6/1970 | Bell .......... | 235/61.11 R |
| 3,525,869 | 8/1970 | Gubisch .......... | 235/61.11 E |

*Primary Examiner*—Daryl W. Cook
*Attorneys*—Sewall P. Bronstein and Donald Brown

ABSTRACT: A mark-detection apparatus having a plurality of photodetectors for receiving light reflected from a plurality of points on an object such as a ticket and wherein a signal is generated representing the difference between the light detected by each of the photodetectors to indicate if a ticket has been altered.

INVENTOR
John W. Donohoe
BY
Dike, Thompson & Bronstein
ATTORNEYS

INVENTOR
John W. Donahoe
BY
Pike, Thompson & Bronstein
ATTORNEYS

MARK-DETECTING SYSTEM

This invention is directed to an optical detection system and more particularly to a system for detecting the presence of a mark on a ticket or the like.

Department stores and other merchandising outlets commonly use tickets which are affixed to the merchandise and have print thereon to indicate the price as well as other information concerning the merchandise, e.g. color, stock no., etc.

In some of the newer merchandising systems using tickets, the tickets not only contain printed information as noted but in addition, contain machine readable information such as magnetic markings to facilitate rapid processing of the ticket.

These tickets, attached to the merchandise, are then generally collected by the sellor's agent as the merchandise is paid for at the checkout counter. The tickets are then subsequently utilized to maintain a running inventory at the particular merchandising outlet, so as to determine when merchandise should be reordered, and what merchandise should be stocked, and other information.

At times the printed price on the ticket is altered by hand during a sale or because of damaged merchandise. Special handling of these remarked tickets is generally necessary since the machine used to read the tickets will be reading erroneous machine readable information which is not correlated with the remarkings. Therefore means must be provided to permit remarked tickets to be recognized and sorted out from tickets which have not been altered.

According to this invention, a scheme for accomplishing this is provided by the use of a ticket which includes selected areas to which pencil mark, or other mark, may be applied and by the provision of an optical system for detecting the fact that a ticket has been remarked, to sort out the remarked tickets from the unaltered tickets.

In accordance with the preferred embodiment of the invention, the above is accomplished by providing means for detecting the presence of a mark on a ticket by measuring the difference between the amount of reflected light detected from an unmarked reference portion of a ticket and the portion of the ticket which has been marked. The presence of a mark (dark color) on the ticket causes less light to be reflected than would normally be reflected from an unmarked area on the ticket. The signal which is generated is then utilized to either indicate an error, stop the machine, or eject the ticket so as to sort out the remarked tickets from the other tickets.

In view of the above, it is an object of this invention to provide a new and improved means for detecting the presence of a mark on a ticket or the like.

A further object of this invention is to provide a new and improved means for sorting unmarked tickets from remarked tickets, or vice versa.

Another object of this invention is to provide means for deriving a difference signal indicating that a ticket or object has been altered, as for example, by the change of price on the ticket.

Other objects and advantages of the invention will be apparent to those skilled in the art from the following detailed description of the drawings in which.

Figure 1:
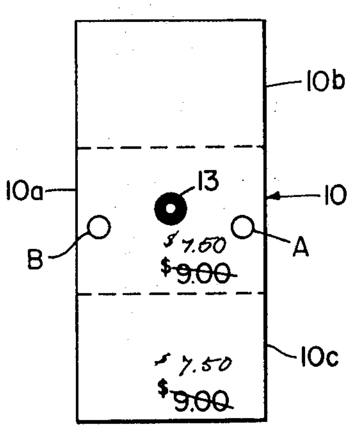
FIG. 1 shows a merchandising ticket which has been remarked.
Figure 6:
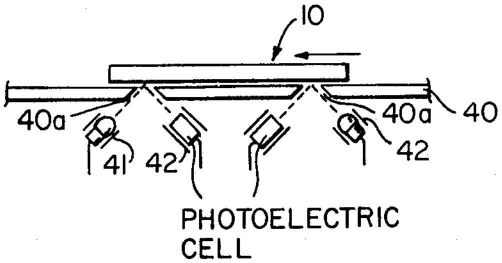

FIG. 6 shows another optical scheme for detecting information from the ticket. detachable, Reference should now be had to FIG. 1 which shows a ticket 10 of the type which can be used in merchandising and inventory control systems. The ticket shown in FIG. 1 and a system for printing machine readable information as well as print on the ticket is disclosed in copending application Ser. No. 787,294, filed Dec. 9, 1968, now Pat. No. 3,517,612, entitled Marking System in the name of Richard Stucchi, and assigned to the same assignee of this invention.

The ticket may comprise as shown a main portion **10*a* and two stub portions 10*b* and 10*c* which may be detachable from the main body portion. The main body portion, 10*a*** of the ticket is preferrable provided with a pair of closed areas such as circled areas shown at A and B. These circled areas A and B are provided to permit the salesperson remarking a ticket to apply a pencil mark which may then be detected to indicate that the ticket has been remarked. Depending upon the system utilized, area A can indicate the price change, whereas area B can indicate some other alteration made on the ticket. Additionally, if desired, marks in both areas A and B can be utilized as a double check, to indicate whether a ticket has been remarked.

In addition the ticket 10 is preferably provided with a center hole at 13 which is utilized as disclosed in the aforementioned patent application for locating the ticket, so that information may be written on magnetic media (not shown), which is positioned about the hole 13. Also, as disclosed in this application, a probe or a ticket injector may be inserted within the hole 13 to eject the ticket and to throw it into a bin when it is determined that a ticket has been remarked.

Figure 2:
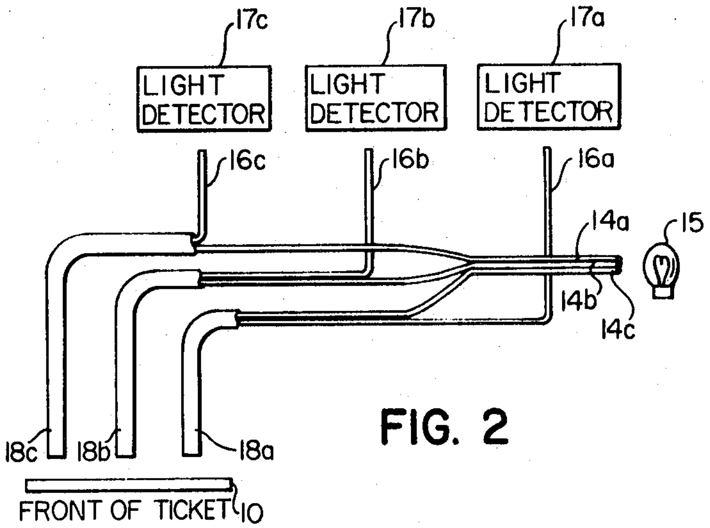
FIG. 2 shows diagrammatically the photo-optics for detecting information from the ticket.
Figures 3, 4:
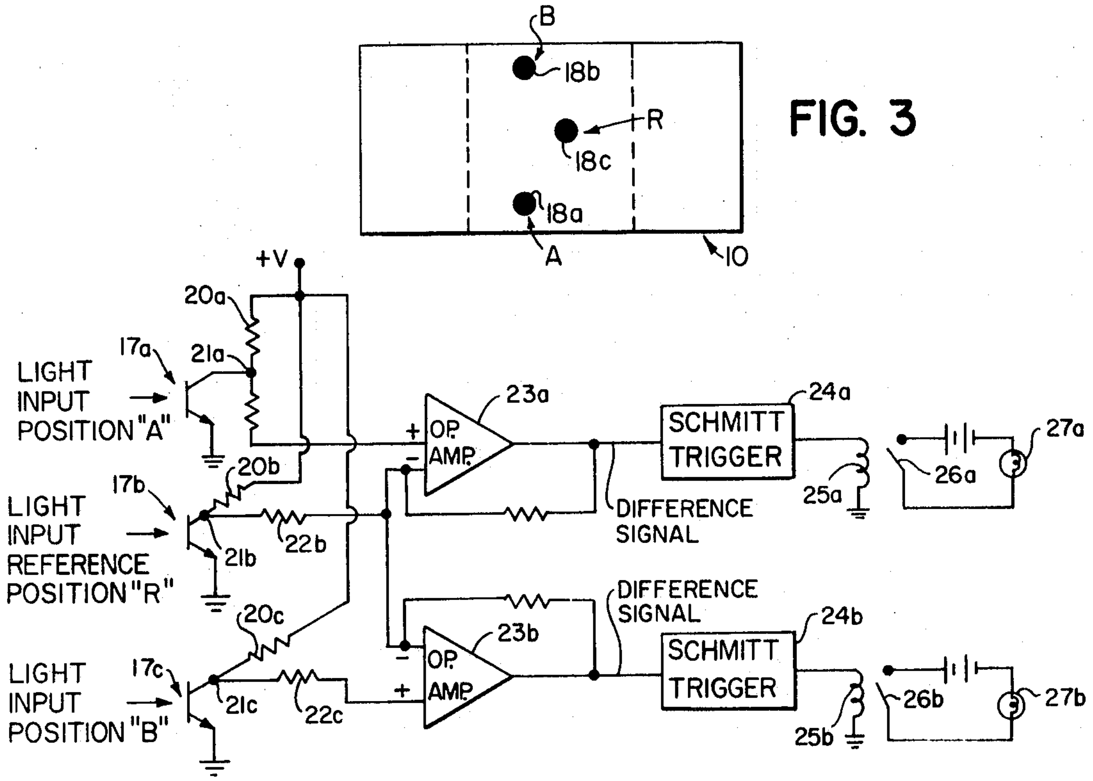
FIG. 3 shows diagrammatically the position of fiber optic probes used in one of the embodiments for detecting information from the ticket.
FIG. 4 shows a schematic circuit diagram of the apparatus according to the invention.

In FIGS. 2 and 3 there is disclosed a fiber optic system for providing light to scan points A and B, as well as to provide light to scan a reference position R (a position somewhere on the ticket where there would normally be the absence of any marks).

The optical system comprises light pipes or fibers **14*a*, 14*b* and 14*c*, (e.g. glass), for directing light from a light source shown at 15 to the portions of the ticket which are to be scanned. In addition, the optical system includes fibers shown at 16*a*, 16*b* and 16*c*** for detecting reflected light from the areas of the ticket being scanned.

Light detectors, such as photoelectric devices are shown at **17*a*, 17*b* and 17*c* for detecting reflected light provided thereto by the fibers 16*a*, 16*b* and 16*c*. The fibers for carrying the light as well as for returning the reflected light to the detectors are combined in probes shown at 18*a*, 18*b*, and 18*c***, each having a lighttight outer housing. Each of the light pipes or fibers in the probes are also preferably surrounded by lighttight wrap or cover to prevent crosstalk between the two light pipes of each probe.

Reference should now be had to FIG. 3 which shows a preferred arrangement of the reference probe and in the scanning probes with respect to the ticket. It should be noted that the reference probe is preferably somewhat offset, or out of line with the probes **18*a* and 18*b*** to lessen the possibility of interference between probes.

In FIG. 4 there is shown a schematic diagram of a circuit for deriving a difference signal to indicate the presence of a mark in either area A or area B of the ticket. The circuit includes light detectors, such as photoelectric detectors, **17*a*, 17*b* and 17*c* which are responsive to light reflected from the ticket into the light pipes 16*a*, 16*b*, and 16*c*. The current through the detectors 17*a* through 17*c* increases with an increase in received light and decreases with a decrease in received light and the voltage across the photodetector varies inversely to the current flowing therethrough. Accordingly, the presence of a black mark, (which does not reflect as much light off the ticket as does a white area) causes the voltage across the detector to increase because the detector represents a larger value of resistance. Each of the photoelectric devices are connected in a bridge network and to operational amplifiers to derive a difference signal indicating the presence of a mark. In particular, electrical devices 17*a* and 17*b* are coupled to resistors 20*a* and 20*b* respectively, both coupled to a bias source +V. The points 21$a$ and 21$b$ are then coupled through resistors 22$a$ and 22$b$ to the plus and minus inputs of a dual input operational amplifier 23$a$. Thus when a mark is present, there will be a large difference between the inputs to the operational amplifier 23$a$ and therefore a difference signal will be obtained indicating the presence of a mark. The difference signal is provided to a level detector such as Schmitt Trigger 24$a$, which then turns on. The turning on of the Schmitt Trigger 24$a$ causes a current to flow through a relay coil 25$a$ thereby closing a switch 26$a$ which causes error light or indicator 27$a$ to turn on, indicating that a ticket must be removed because it is a remarked ticket. In addition, the difference signal could be used to stop the machine if tickets are moving through the machine, so as to permit the operator thereof to remove the ticket. The circuitry for detecting the presence of a mark in position B on the ticket is the same as the circuitry shown for detecting the mark in area A. Photodetector 17$c$ is coupled through a bridge resistor 20$c$ and point 21$c$ is coupled through a resistor 22$c$ to an operation amplifier shown at 23$b$. In like manner a difference signal is obtained which is used to trigger a Schmitt Trigger 24$b$ to cause current to flow in coil 25$b$ closing switch 26$b$ and turning on the indicator light 27**$b$.

With the circuit shown in FIG. 4 ambient light conditions will not substantially affect detection of a mark in the areas A or B, because the reference signal and the signal from the areas A or B which applied to the operational amplifier from the bridge circuit will be tracking each other. That is both the reflected reference signal and the reflected signal from areas A or B will be changing in the same direction as ambient light changes, or as the components age. It should be understood, that this system can be operated using ambient light, and instead of detecting marks, the areas A and B could be punched out and the information thus provided can be used in a like manner.

It will be understood that the circuit shown in FIG. 4 may vary according to the particular application. The following circuit specifications are included for the circuit of FIG. 4 by way of example only; V=6 volts, Photodetectors 17$a$–17$c$—Motorola type 300, Operational amplifiers 23$a$ and 23$b$—Texas Instruments, Type SN 727, and Resistors 20$a$ and 20$c$=51 K ohms.

Figure 5:
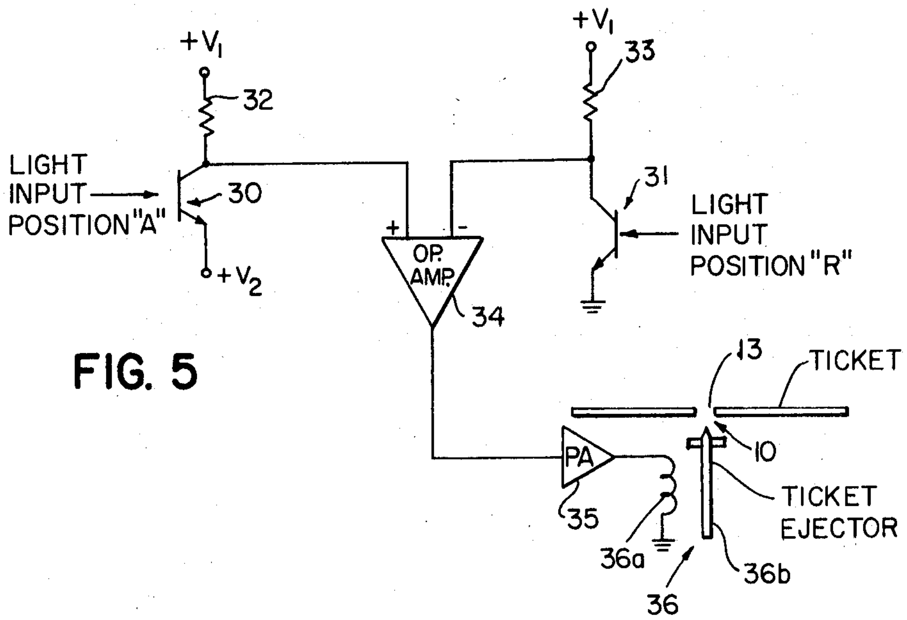
FIG. 5 shows a modification of the circuit of FIG. 4, including means for ejecting the ticket based on the information derived from the ticket.

Reference should now be had to FIG. 5 which shows a modification of the circuit of FIG. 4. The photodetectors are shown at 30 and 31 respectively and are connected in a bridge circuit with resistors 32 and 33. The photoelectric detector 30 has its emitter attached to a positive potential instead of being grounded as in the circuit of FIG. 4. Thus the voltage applied to the positive terminal of the operational amplifier 34 is less than what would normally be the case and accordingly, the operational amplifier provides a negative output signal. Assuming now that the amount of reflected light significantly decreases because of the presence of a mark the voltage to the positive terminal to the operational amplifier will therefore significantly increase so this now causes the operational amplifier to switch over and to provide a positive output signal which is used to turn on a power amplifier 35 which causes current to flow through a solenoid 36, having a coil 36$a$ which then causes a ticket ejector 36$b$, normally in a retracted position, to rise and kick out the ticket 10.

The ejector is provided with a tip which enters the hole 13 in the ticket and causes the ticket to be ejected as the crosspiece portion of the ejector engages the bottom of the ticket. In this manner, a ticket is ejected from a line of tickets moving upon a machine bed.

Reference should now be had to FIG. 6 which shows a modified embodiment of the photo-optics for deriving reflected signals from the ticket. In this figure the ticket is again shown at 10 and is positioned on a machine bed over which it is adapted to move. An example of a mechanism for moving tickets over a machine bed is shown in the aforementioned patent application referred to in the beginning of this specification. The machine bed is provided with a plurality of openings shown at 40$a$ which are positioned to permit the areas A, B and R on the ticket to be scanned. Light is provided through a light source and light director arrangement shown at 41 and is detected through a photoelectric cell arrangement shown at 42 which is responsive to deflected light. The photodetectors are then coupled as for example in the arrangement previously disclosed to indicate the presence of a mark on the ticket.

It will thus be seen that the objects set forth above, among those made apparent from the preceding description are officially obtained and that certain changes be made in the above instructions without departing from the spirit and scope of the invention. It is intended that all matter contained in the above description and shown in the accompanying drawings shall be interpreted as illustrative and not in a limiting sense.

It should also be understood that the following claims are intended to cover all generic and specific features of the invention herein described and that all statements of the invention which are a matter of law, which might be said to fall therebetween.

I claim:

1. A mark-detection system for a ticket reader or the like wherein the ticket used in the system includes an area for applying a mark thereto and an area where no marks are to be applied thereto, said system comprising first means for detecting light reflected from the area on the ticket where a mark is to be applied, second means for detecting light reflected from the area on the ticket where a mark is not normally applied, and third means responsive to signals from said first and second means for deriving a signal, indicating a difference in the amount of detected light.

2. A system according to claim 1 wherein said first and second means are arranged in a bridge circuit and wherein said third means is coupled across said bridge circuit to detect voltage changes across said first and second means as a result of changes in detected light.

3. A system according to claim 2 wherein means is provided to direct light against the ticket.

4. A system according to claim 1 including fourth means responsive to said signal for indicating that the ticket has a mark thereon.

5. A system according to claim 1 including ejection means responsive to said signal for ejecting a ticket from the machine upon the detection of a mark on the ticket.

6. A mark-detection system comprising first means positioned to detect light from a plurality of different positions on an object, second means for comparing the amount of light detected from sad plurality of different positions on the object to generate a signal indicating a difference in detected light from said plurality of positions.

7. A system according to claim 6 wherein third means responsive to the signal is activated upon the detection of a mark placed on the object to permit the ticket to be removed from a group of tickets being read.

8. A system according to claim 7 wherein said third means comprises means for ejecting the object from the detection system.

9. A system according to claim 7 wherein said third means comprises error-indicating means.

10. A system according to claim 6 wherein said object comprises a ticket and wherein said means for comparing comprises an operational amplifier coupled to said second means.